United States Patent [19]

Ledeen et al.

[11] 4,109,512

[45] Aug. 29, 1978

[54] LINEBREAK DETECTION SYSTEM

[75] Inventors: Howard L. Ledeen, Pasadena; Franz Schmon, Granada, both of Calif.

[73] Assignee: Ledeen Flow Control Systems, Sun Valley, Calif.

[21] Appl. No.: 837,684

[22] Filed: Sep. 29, 1977

Related U.S. Application Data

[63] Continuation-in-part of Ser. No. 718,757, Aug. 30, 1976, Pat. No. 4,051,715.

[51] Int. Cl.$^2$ ............................................. G01M 3/28
[52] U.S. Cl. ................................... 73/40.5 R; 137/12
[58] Field of Search ............... 73/40.5 R; 137/12, 14, 137/456, 457

[56] References Cited

U.S. PATENT DOCUMENTS

| | | | |
|---|---|---|---|
| 3,612,081 | 10/1971 | Williams | 137/12 |
| 3,665,945 | 5/1972 | Ottenstein | 137/14 |
| 3,776,249 | 12/1973 | Wailes et al. | 137/14 |
| 3,952,759 | 4/1976 | Ottenstein | 137/12 |

*Primary Examiner*—Charles A. Ruehl

[57] ABSTRACT

A pipeline break detection system wherein a rate timing device is activated in response to a predetermined pressure drop in the pipeline to direct a signal and activate the on-delay cycle of an energy-blocking device, such as a relay switch in an electric circuit. The timing device then commences an off-delay cycle, and if such cycle continues to completion, it cancels the countdown of the on-delay relay. However, if the pipeline experiences a further like pressure drop, before the timing device completes its cycle, it will be recharged and remain activated to keep the on-delay relay actuated. If the pipeline pressure fails to level off to allow the rate timer relay to close, and the on-delay relay is thus enabled to complete its timed cycle, the relay closes to deliver an electrical signal.

5 Claims, 4 Drawing Figures

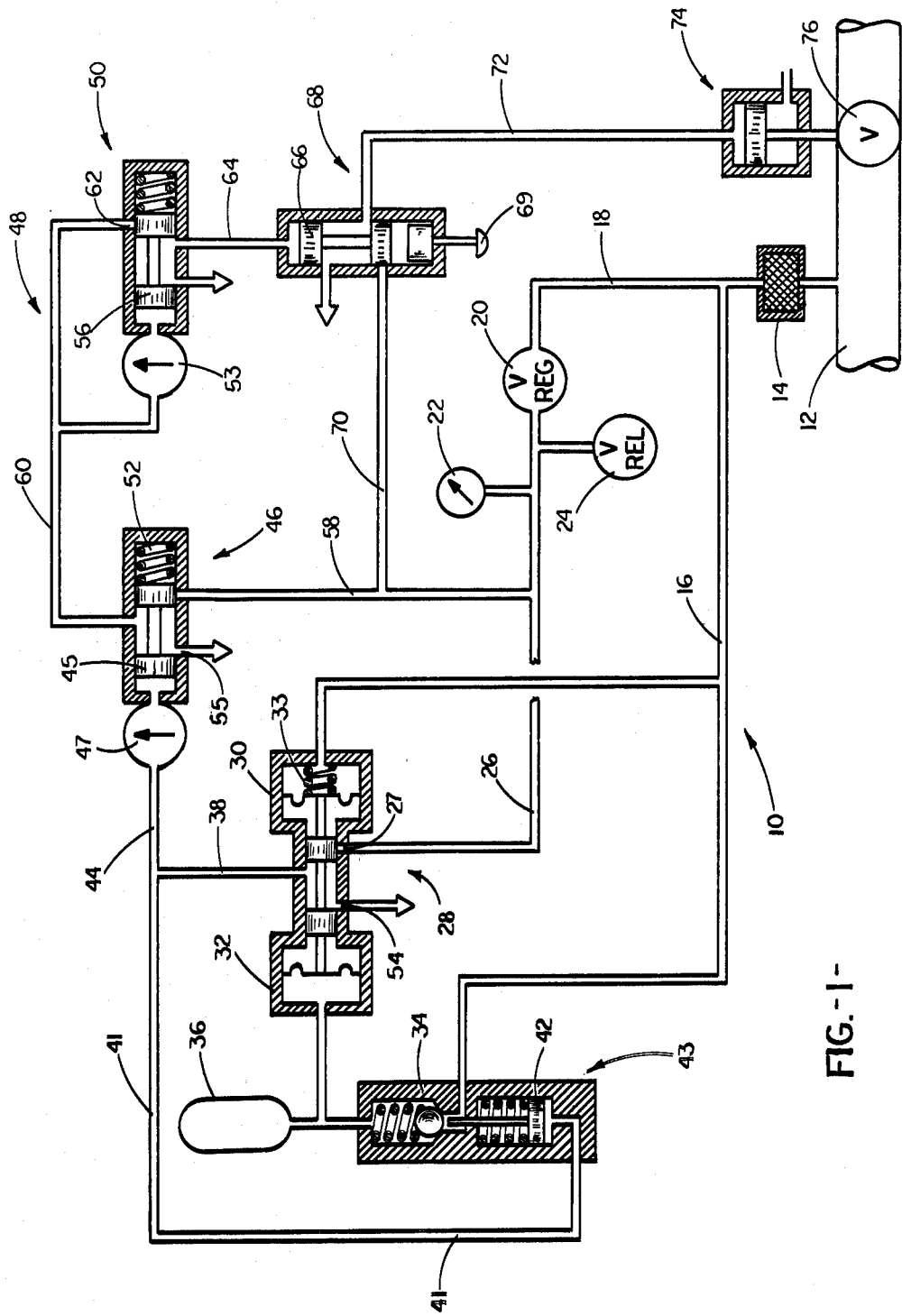
FIG.-1-

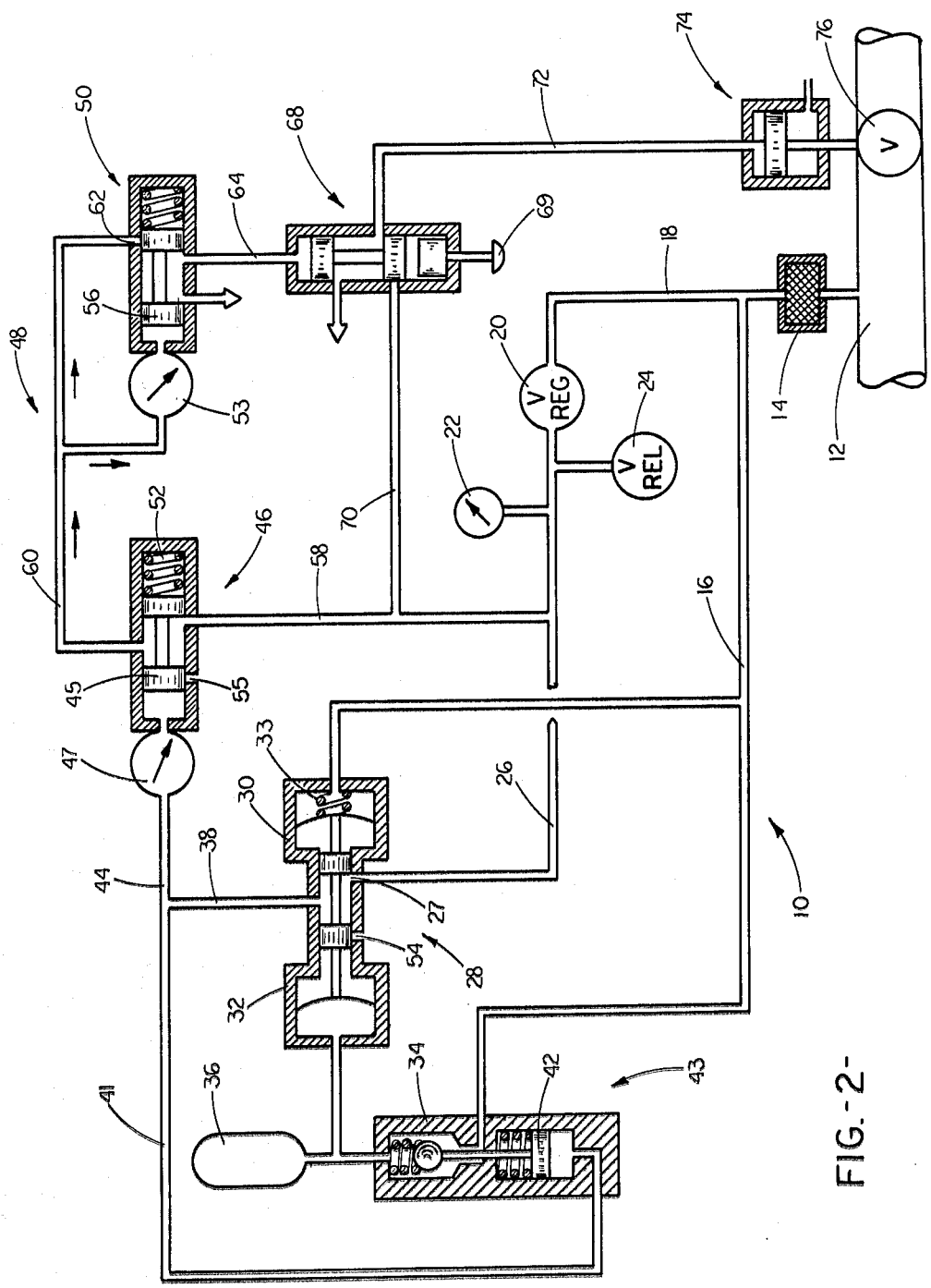
FIG.-2-

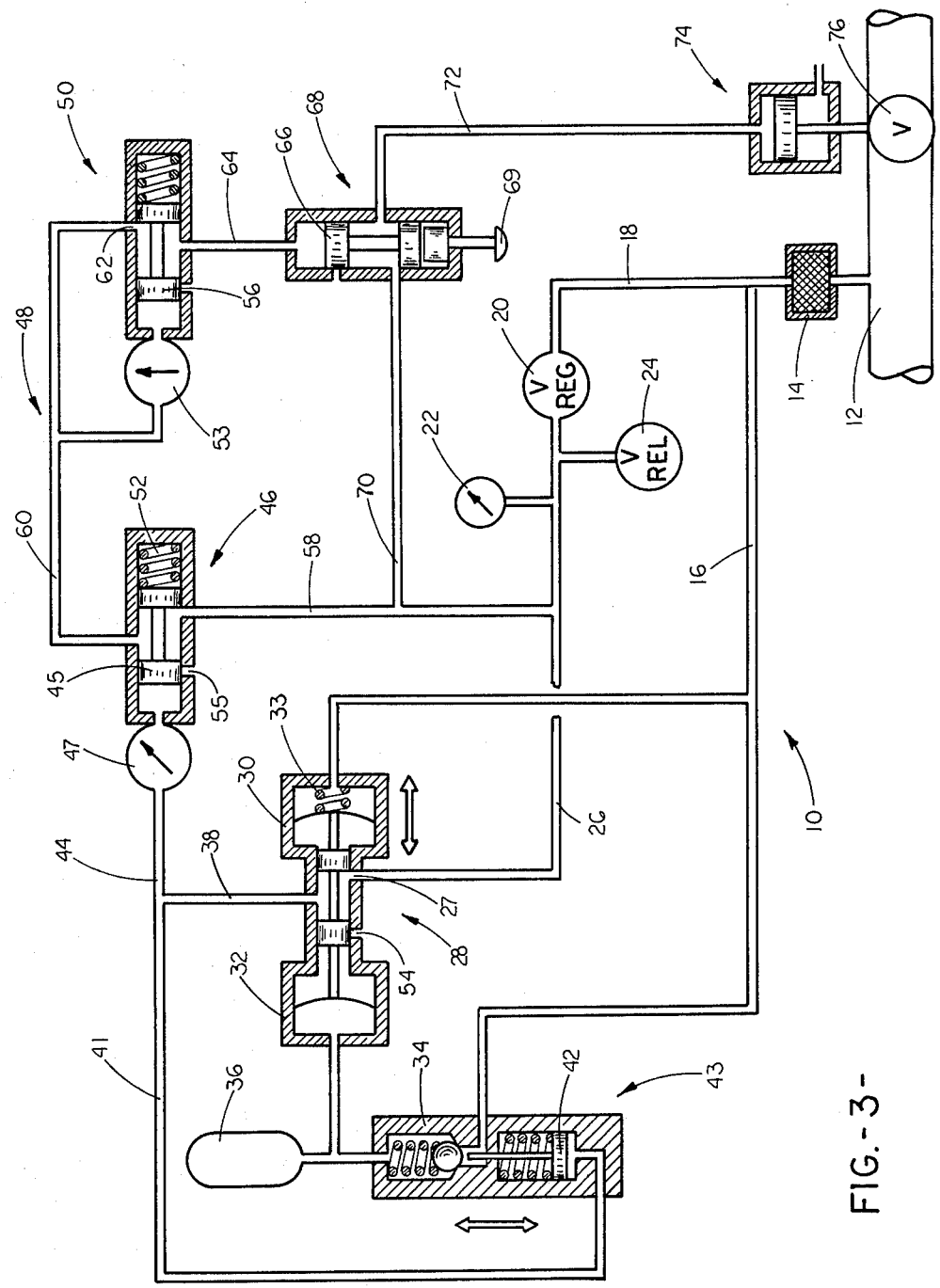
FIG.-3-

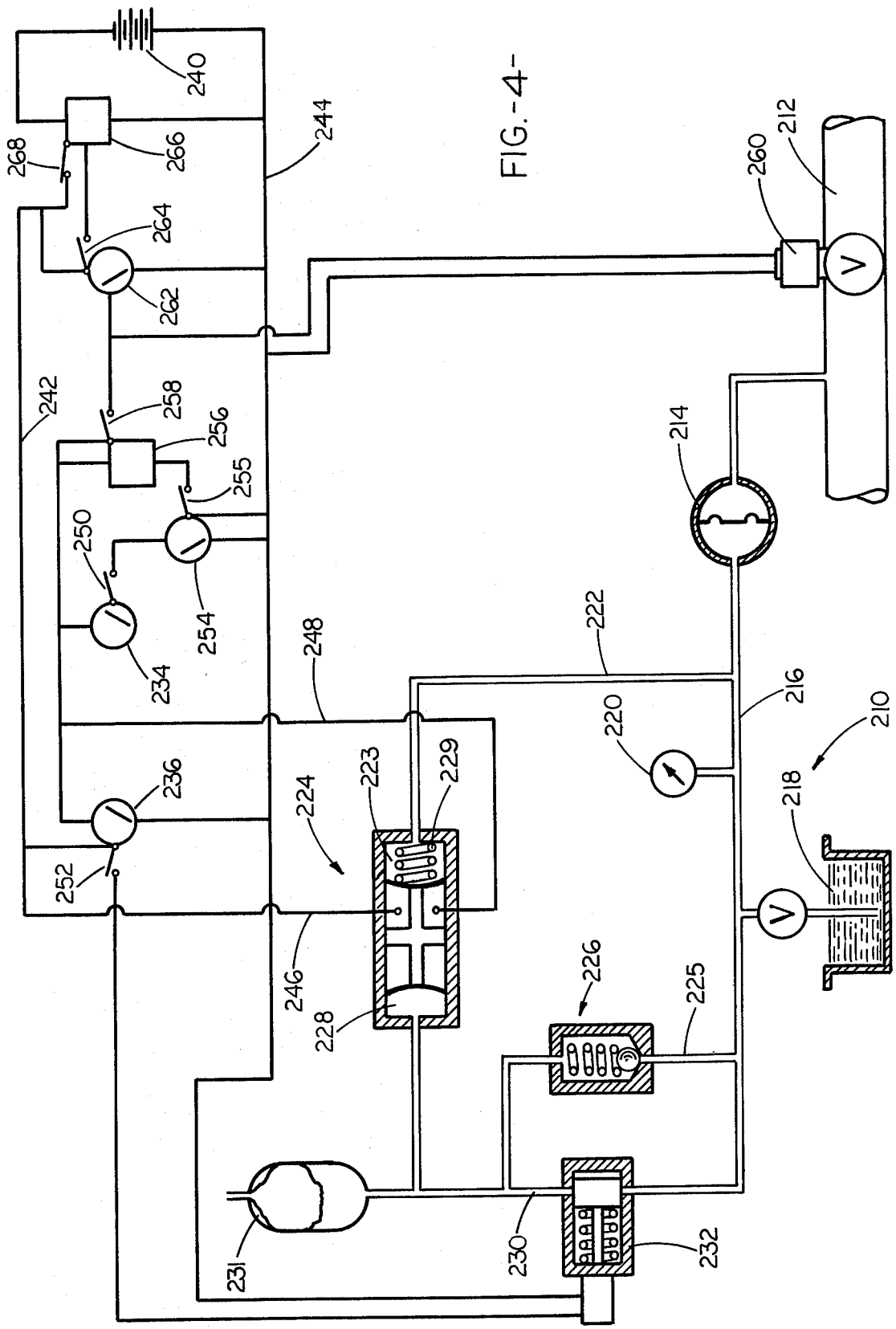
FIG.-4-

LINEBREAK DETECTION SYSTEM

This is a Continuation-In-Part of our co-pending application 718,757 filed August 30, 1976 for "Line Break Detection System", now U.S. Patent No. 4,051,715.

BACKGROUND OF THE INVENTION

This invention relates to a pipeline break detection system and, more particularly, to a system for monitoring the rate at which pressure in a pipeline falls. Previous pipeline break detector systems delivered an output signal in the system. However, such break detection systems were generally extremely complex with numerous high quality components and extensive plumbing or they could not distinguish a fast, short term surge from an actual linebreak, and often required an external power source.

OBJECTS OF THE INVENTION

It is an object of this invention to provide a system for monitoring the rate at which pipeline pressure drops, and to deliver a remedial signal in the event that rate exceeds a predetermined level.

It is a further object of this invention to provide a pressure rate monitoring system wherein a timing cycle is initiated by a predetermined pressure drop to deliver a remedial signal should a like pressure drop occur within the timed cycle.

It is a further object of this invention to provide a pressure rate monitoring system which delivers a signal in the event of a predetermined pressure drop in a predetermined time period, indicative of a line break.

It is a further object of this invention to provide a line break detection system which delivers a delayed output signal in response to a pressure drop which delay insures that the output signal will be activated only if the pressure drop continues for a timed period.

Other objects and advantages of this invention will become apparent from the description to follow when read in conjunction with the accompanying drawings.

SUMMARY OF THE INVENTION

In carrying out this invention, I provide a timed relay system including an output relay which closes after a predetermined time delay to deliver a signal to close a valve, trigger an alarm or the like. A rate timer relay, when charged, delivers an energy signal to the output relay to trigger the on-delay cycle thereof. Shortly thereafter the rate timer relay itself starts an off-time countdown, which if completed, relieves and inactivates the output relay. The rate timer relay is charged and opened in response to a signal delivered from a differential relay, which, in turn, operates in response to a predetermined pipeline pressure drop and then opens again. If a further, like pressure drop occurs, the differential relay closes again to again activate the rate timer, and this cycling continues as long as the pipeline pressure falls. If the subsequent operations of the differential relay occurs before completion of the off-time cycle of the rate timer, the rate timer simply stays active and a complete new countdown cycle is initiated. As long as the rate timer is not allowed to return to its inactive position by reason of a continuing pressure drop, the output relay will not be relieved, and its countdown to operative condition continues. If the output relay completes its timed cycle, it delivers a signal to close a valve, sound an alarm or the like.

If, on the other hand, pipeline pressure does not fall a like amount prior to completion of the rate timer countdown, it will shift back to its off position, wherein it aborts the countdown of the output relay, returning the entire system to null status, ready to respond to further pressure drops.

BRIEF DESCRIPTION OF THE DRAWINGS

In the drawings:

FIGS. 1 to 3 are schematic diagrams of an embodiment of this invention in various stages of operation; and FIG. 4 is a schematic diagram of another embodiment of this invention.

DESCRIPTION OF PREFERRED EMBODIMENTS

The Embodiment of FIGS. 1 to 3

Referring now to FIGS. 1 and 2 with greater particularity, the system 10 of this invention is shown in conjunction with a pipeline 12 for transmission of gas, which may be passed through a filter 14 and then directed separately to a differential relay pilot line 16 and a timed cycle relay system line 18.

In the timed cycle relay system line 18, the pressure may be reduced at regulator 20 to a desired control pressure of say 40 to 100 psi. A gauge 22 may be provided to monitor the system pressure, and a relief valve 24 is provided to vent excess pressure and keep it in the desired range in the event of a failure in the regulator 20. In any event, the system's gas, as so regulated, in directed through line 26 to a normally closed port 27 of a differential relay valve 28.

In the absence of a pressure drop, the differential relay pilot line 16 maintains the low pressure pilot 30 and the high pressure pilot 32 (both shown as diaphram controls) of the differential relay valve 28 continuously under the pressure of the pipeline 12. Hence, under normal conditions, the differential relay valve 28 will be in pressure balance, and biased by a spring 33 to remain in the closed position shown in FIG. 1 with port 27 shut off. Flow of the gas at pipeline pressure through pilot line 16 to the high pressure pilot 32 is through a check valve 34, which communicates also with a volume tank 36. In the event of a drop in pressure in the pipeline pilot line 16, as in the event of a pipeline break, flow from the high pressure pilot 32 and the volume tank 36 is prevented by the check valve 34. Hence, the fluid asserted against pilot 32 is trapped at the previous pressure level of the pipeline pilot line 16, while that asserted against the low pressure pilot 30 falls off to the newly existing level of the pilot line 16. Should this pressure differential between pilots 32 and 30 be sufficient to overcome the spring 33, say 10 psi, the differential relay 28 will shift to the position shown in FIG. 2, enabling flow to differential valve outlet line 38..

When the differential relay 28 is so opened, the relay system gas from outlet duct 38 flows simultaneously through line 41 to the pilot 42 of the check valve 34 and through line 44 to the pilot 45 of a rate timer relay or valve 46. The rate timer relay forms part of a time delay control system 48, which also includes an output timer relay 50. The rate timer relay 46 is of the off-delay type while the output timer relay 50 is of the on-delay type. That is, a timing mechanism 47 in rate timer valve 46 is set by pressure asserted at the pilot 45 as indicated in FIG. 2 and, at the instant that pilot pressure is relieved through port 54 of the differential relay 28, as shown in FIG. 1, it commences it's countdown to release a valve-closing spring 52. In the output relay 50, the timing mechanism 53 is initiated by pressure asserted at the pilot 56 when the rate timer relay 46 opens the system line 58 to line 60, and its countdown continues to completion as long as so pressurized. If the countdown of timer 53 is completed, the output valve 50 opens to enable flow through outlet passage 64, but if the pressure at pilot 56 is relieved, the countdown timer 53 is cancelled.

When the differential relay 28 is shifted to the open position shown in FIG. 2 both the rate timer relay 46 and the pilot operated check valve 34 are shifted to their open positions. Hence, the rate timer valve 46 is opened to acutate the output relay timer mechanism 53 and the check valve 34 opens by action of the pilot 42, to relieve the high pressure pilot 32 and volume tank 36 to the reduced level of the pilot line 16, i.e. that of the low pressure pilot 30. With the high and low pressure pilots 32 and 30 again in balance, the spring 33 shifts the differential relay 28 back to the position shown in FIG. 1 wherein the pilot 45 of rate timer 46 and the pilot 42 of check valve 34 are relieved at port 54 of differential relay 28, to allow check valve 34 to close and the rate timer 47 to commence its off-delay countdown, which if completed, allows the spring 52 to shift the rate timer relay 46 back to its initial position shown in FIG. 1 relieving the output relay pilot 56 at vent 55.

If the output relay 50 is able to complete its timed cycle before it is vented and cancelled by the delayed return of the rate timer 46 to its FIG. 1 position, the output relay 50 shifts to open position shown in FIG. 3 to enable flow at normally closed port 62 and through line 64 to the pilot 66 of an output valve 68, which in turn delivers a system pressure signal from lines 18, 58 and 70 to output line 72. Such fluid signal may be employed to activate a valve operator 74 to close a valve in the pipeline 12, or to otherwise initiate steps to minimize damage from the break. Once the output valve 68 has been piloted to its open position, it maintains its output pressure signal until it is manually reset at 69 to the originally closed position, independent of the actions of the timers.

Summarizing the operation of the system 10, the differential valve 28 opens with every fixed increment of pressure drop of an amount to enable the high pressure pilot 32 to overcome the spring 33. This enables flow of system pressure fluid from line 26 to lines 44 and 41 to open the rate timer relay 46 and the check valve 34, respectively. Opening the check valve 34 relieves the high pressure pilot 32, closing the differential valve 28 which vents the rate timer pilot 45 whereby the timer 47 commences its countdown to closed position. If another fixed pressure drop increment is reached before such countdown is completed the differential valve opens again to recharge the rate timer, which when again relieved through differential valve vent 54, starts a new countdown cycle.

When the rate timer relay 46 is first opened, it charges the output relay 50 to start its countdown to open. Hence, if the rate timer relay 46 is held open by continued pipeline pressure drops which keep the differential valve 28 cycling as described, the output relay timer 60 may have an opportunity to complete its countdown and move to the open position shown in FIG. 3 wherein the fluid signal is delivered.

As long as the pipeline pressure continues to fall as in a line break, the differential relay valve 28 and the pilot operated check valve 34 will continue to cycle as indicated by the double arrows in FIG. 3 and, assuming a cycle time less than that determined for line break criteria, the rate timer relay 46 will simply be held open until the on-delay output relay is shifted to the position shown in FIG. 3 wherein system pressure flows through it to the pilot 66 of the three way valve 68, and system pressure fluid flows through the lines 70 and 72 to deliver an output signal at 74. This could be used to operate a valve actuator 74 to close off a valve 76. The three way valve 68 is reset manually in order to cancel the line-break signal.

Since the setting of the time period ($T_r$) for the rate timer 47 as well as that ($T_o$) for the outer timer 53 are the only adjustments required in the system, it is important to relate pressure factors to time for both timers. For example, the rate timer 47 is set in accordance with the following equation:

$$T_r = 60 \times (\Delta P / R_C)$$

where:

$T_r$ (in seconds) is the time setting of the rate timer 47;

$\Delta P$ is the pressure differential which will overcome the spring 33 to shift the differential relay valve 28. As described previously, this pressure differential has been selected at 10 psi; and $R_C$ (psi/min.) is the accepted "criterion" rate of pressure drop in the pipeline which has been predetermined to correspond to a line break. This may also be expressed ($\Delta P / \Delta T_r$).

The factor 60 is introduced into the equation to convert the psi per minute factor to seconds as needed for the timer setting.

Using the above equation, suppose it is desired to receive a line break signal if the pressure in the pipeline drops at least 20 psi per minute, i.e. $R_C = 20$. Then:

$$T_r = (60 \times 10)/20 = 30 \text{ seconds}$$

$T_r$ is the time required to drop the pressure $\Delta P$ at a rate of $R_C$ and, in the example shown, 30 seconds is the time required to drop the pressure 10 psi at the rate of 20 psi per minute. If the rate timer 47 is set at 30 seconds, any rate larger than 20 psi per minute will recharge the timer for a new timing cycle $T_r$ before completion of the cycle in which it is engaged. Therefore, the rate timer relay 47 will continue to supply pressure to the pilot 56 of the on-delay output relay 50 which is still making its countdown $T_o$. The output timer 53 should be set to exceed the rate time 47 by at least several seconds, e.g. 10 seconds. Hence, in the example above, the output timer 53 should be set at 40 seconds. With these settings $T_r$ and $T_o$ for the rate timer 47 and the output timer 53, respectively, any rate of pressure drop exceeding 20 psi per minute will result in an output signal being delivered through line 64 from output relay 50 exactly 40 seconds after the start of the output timer cycle $T_o$.

In the pipeline applications wherein large pressure transients may occur, as is often the case in liquid product pipelines, it may be desirable to allow for multiple confirmation of the rate of pressure drop before a final output signal is provided. This can prevent premature response to a rate change which may last just long enough to fulfill the one cycle rate condition but then might recover. To provide such multiple confirmation, the output timer 53 may be set at 2, 3 or 4 times $T_r$, depending on the number of repeat check cycles desired. For multiple confirmations, each individual cycle must equal or exceed the rate for which the rate timer 47 is adjusted. If any one of the multiple confirmation cycles measures a rate below the criterion rate, the rate timer relay 46 will return to the position shown in FIG. 1 to vent the pilot 56 of the output relay 50 and reset to a new start of multiple confirmation checks.

The Embodiment of FIG. 4

This electrically controlled, electric output system 210, may be operated in conjunction with a liquid carrying pipeline 212. A bladder or diaphragm type separator 214 may be provided to transmit the pressure from the pipeline to the ΔP pilot line 216 filled from a suitable supply 218 with a clean, hydraulic fluid of low viscosity, a pressure gauge 220 being provided to monitor the system.

The fluid in line 216 is directed through line 222 to the low pressure side 223 of a pressure differential switch 224, and through line 225 past a check valve 226 to the high pressure side 228 of the pressure differential switch. It will be noted that pressure in the low pressure side 223 of the differential switch 224 is augmented by a spring 229. Fluid from high pressure side 228 also flows to line 230 and a volume tank 231 which is pre-charged with gas ($N_2$) slightly below the minimum required operating pressure. A normally closed solenoid valve 232 is disposed in by-pass line 230.

In the event of an increase in pressure in the pipeline 212 the fluid in line 216 will flow through line 222 to the low pressure side 223, and past check valve 226 to the high pressure side 228 to maintain the pressures whereby the spring 229 will hold the switch 224 open. The increasing pressure in the pipeline 212 will compress the gas in volume tank 231 and fill that tank partially with hydraulic fluid. However, if pressure in pipeline 212 should fall off, the check valve 228 will close to keep the pressure at the high pressure side 228 at its previous level. Then, if the pressure should decrease by an amount sufficient to enable that pressure to overcome the low pressure side 223 plus the spring 229, the differential switch 224 will close to energize the coils of a pair of off-delay (or open-delay) relays 234 and 236 from a suitable source of current 240 through conductors 242 and 244 and leads 246 and 248. Energization of the coils of relays 234 and 236 will close their contacts 250 and 252 respectively to energize a on-delay (or closed-delay) relay 254 and the solenoid valve 232.

After a preset timed delay following energization of the on-delay relay 254, it closes its switch 255, this delay being longer than the on-delay cycle of relay 234. In the meantime, the energized by-pass off-delay relay 236 has closed its switch contacts 252 to energize solenoid valve 232 and enable flow from high pressure side 228 and volume tank 231 to equalize with line 216, returning the pressure differential switch 224 to its normally open position, de-energizing the relays 234 and 236 and starting their open-delay cycles.

The by-pass, open-delay relay 236 is set for a very brief cycle, say one second, just to insure that the high and low pressure sides 228 and 223 of the pressure differential switch 224 reach a complete condition of balance before the solenoid operated by-pass valve 232 is returned to its normally-closed position. The main off-delay relay 234 is now timing simultaneously with the on-delay relay 254, but for a shorter cycle. If there is no line break, and pressure differential switch 224 remains in the normally open position to which it has been returned, the main off-delay 234 will complete its cycle and automatically be de-energized, opening its switch 250 to de-energize the on-delay relay 254, interrupting its timing cycle and returning the system to its original standby condition.

However, if there is a line break, the pressure in pipeline 212 will continue to drop and the pressure differential switch 224 will again shift to its closed position before the off-delay timer 234 completes its first cycle and it will start an additional full cycle. This re-setting of timer relay 234 will continue as long as the pressure in the pipeline continues to drop. When the setting of the on-delay timer 254 expires, its contacts 255 will close to energize a latching relay 256 which, upon closing of its contacts 258 activates suitable emergency measures. This could include energization of an electrically activated valve operation 260 in the pipeline 212.

As an additional feature of this invention, a further on-delay relay 262 may be activated by the closing of switch 258 of latching relay 256, setting an on-delay time cycle of any suitable duration, say three minutes. When this interval expires, the contacts 264 of on-delay relay 262 will close to energize still another latching relay 266 and open its normally closed switch 268 which is connected in series with power line 242, and disconnect the electrical power from the system 210. Hence, after the electrically energized valve actuator 260 has closed off the pipeline, the electrical system is shut-off to eliminate further energy requirements. After pipeline repairs, the system may then be reset manually by suitable means (not shown).

While this invention has been described in conjunction with preferred embodiments thereof, it is obvious that modifications and changes therein may be made by those skilled in the art without departing from the spirit and scope of this invention, as defined by the claims appended hereto.

What is claimed as invention is:

1. A pipeline pressure drop monitoring system comprising:
   means for transmitting an actuating signal in response to each decrease in pipeline pressure of a given increment;
   timing means activated by receipt of an acutating signal to deliver an energizing signal for a predetermined period;
   output means conditioned while a said energizing signal is imposed thereon to deliver an action signal after a timed delay longer than said predetermined period;
   said output means comprising;
   a source of electricity;
   electrical circuit connected from said source to said output means; and
   a normally-open, on delay relay having a switch connected in parallel in said circuit and adapted to be closed after a time delay cycle;
   said time delay cycle being longer than said predetermined period and being initiated and continued while a said energizing signal is imposed thereon.

2. The pipeline pressure drop monitoring system defined by claim 1 wherein:
   said timing means is an off-delay relay having a switch connected in parallel in said circuit conditioned to be closed upon receipt of said actuating signal and to be opened after a timed delay initiated when said actuating signal is terminated.

3. The pipeline pressure drop monitoring system defined by claim 1 including:
   a normally closed open-delay relay switch connected in series in said circuit and energized to open after a timed delay after said on-delay relay switch is closed.

4. The pipeline pressure drop monitor system defined by claim 1 wherein said actuating signal transmitting means comprises:
- a differential switch in said circuit movable between open and closed positions;
- first and second pilot lines connecting said pipeline to opposite sides of said differential switch to bias same toward said open and closed positions, respectively;
- means delivering a pre-set force corresponding to said given increment of pipeline pressure to bias said enabling device to said open position; and
- a check valve preventing reverse flow in said second pilot line.

5. The pipeline pressure drop monitoring system defined by claim 4 including:
- a by-pass, signal-operated means for rendering said check valve ineffective;
- means operative in response to movement of said enabling device to said second position to deliver a by-pass signal.

* * * * *